United States Patent
Niethammer

(10) Patent No.: US 10,605,241 B2
(45) Date of Patent: Mar. 31, 2020

(54) PUMP FOR A SELECTIVE CATALYTIC REDUCTION (SCR) SYSTEM IN VEHICLES COMPRISING AT LEAST ONE PUMP ELEMENT COMPRISING A PUMP PISTON, A SPRING BELLOW, AND AN ACTUATION TAPPET UNDER FORCE OF A COMPRESSION SPRING SURROUNDING THE SPRING BELLOW

(71) Applicant: Bernd Niethammer, Koenigsfeld (DE)

(72) Inventor: Bernd Niethammer, Koenigsfeld (DE)

( * ) Notice: Subject to any disclaimer, the term of this patent is extended or adjusted under 35 U.S.C. 154(b) by 494 days.

(21) Appl. No.: 15/096,868

(22) Filed: Apr. 12, 2016

(65) Prior Publication Data
US 2016/0298621 A1 Oct. 13, 2016

(30) Foreign Application Priority Data
Apr. 13, 2015 (DE) .................. 10 2015 004 868

(51) Int. Cl.
*F04B 49/16* (2006.01)
*F01N 3/20* (2006.01)
(Continued)

(52) U.S. Cl.
CPC ............ *F04B 49/16* (2013.01); *F01N 3/2066* (2013.01); *F04B 9/045* (2013.01); *F04B 19/22* (2013.01); *F04B 43/08* (2013.01); *F04B 43/084* (2013.01); *F04B 53/14* (2013.01); *F04B 53/16* (2013.01); *F01N 2610/02* (2013.01); *F01N 2610/1433* (2013.01); *F04B 17/03* (2013.01); *Y02A 50/2325* (2018.01); *Y02T 10/24* (2013.01)

(58) Field of Classification Search
CPC .......... F04B 49/16; F04B 9/045; F04B 19/22; F04B 43/08; F04B 43/084; F04B 53/14; F04B 53/16; F04B 17/03; F01N 3/2066; F01N 2610/02; F01N 2610/1433; Y02A 50/2325; Y02T 10/24
USPC ................................ 417/415; 92/1, 172–260
See application file for complete search history.

(56) References Cited

U.S. PATENT DOCUMENTS

| 1,330,919 | A | | 2/1920 | Snell | |
| 1,557,878 | A | * | 10/1925 | Reeves | ..................... F04B 9/02 417/473 |

(Continued)

FOREIGN PATENT DOCUMENTS

| CN | 102562229 | 7/2012 |
| CN | 103671041 | 3/2014 |

(Continued)

OTHER PUBLICATIONS

Search Report in related DE Application No. 10 2017 005 069.4 dated Mar. 12, 2018, 12 pages.

(Continued)

*Primary Examiner* — Devon C Kramer
*Assistant Examiner* — Benjamin Doyle
(74) *Attorney, Agent, or Firm* — Andrew M. Calderon; Roberts Calderon Safran & Cole, P.C.

(57) ABSTRACT

A pump for a SCR system in vehicles which includes a housing in which at least one pump element is arranged which is activated by a eccentric drive and has at least one a pump piston. The at least one pump piston includes at least a spring bellow which is elastically deformable during pump operation.

21 Claims, 12 Drawing Sheets

(51) Int. Cl.
  *F04B 43/08* (2006.01)
  *F04B 9/04* (2006.01)
  *F04B 19/22* (2006.01)
  *F04B 53/14* (2006.01)
  *F04B 53/16* (2006.01)
  *F04B 17/03* (2006.01)

(56) References Cited

U.S. PATENT DOCUMENTS

| | | | |
|---|---|---|---|
| 4,053,089 A * | 10/1977 | Gamadia | B05B 11/3035 222/207 |
| 8,875,502 B2 | 11/2014 | Fuchs et al. | |
| 2007/0166174 A1* | 7/2007 | Marriott | F04B 1/0448 417/310 |
| 2008/0008605 A1 | 1/2008 | Bauer et al. | |
| 2014/0072465 A1 | 3/2014 | Adachi et al. | |
| 2015/0159530 A1* | 6/2015 | Groh | F01N 3/2066 60/299 |
| 2016/0208757 A1* | 7/2016 | Pursifull | F02M 59/022 |

FOREIGN PATENT DOCUMENTS

| | | |
|---|---|---|
| DE | 3929073 | 3/1991 |
| DE | 3939002 | 5/1991 |
| DE | 4209775 | 9/1993 |
| DE | 19729198 | 1/1999 |
| WO | WO-2009075581 A1 | 6/2009 |

OTHER PUBLICATIONS

Chinese Office Action and Search Report in related CN Application No. 201610438406.7 dated Jun. 13, 2019, 13 pages.
Reply to the Examination Notice dated Jun. 13, 2019 for CN Application No. 201610438406.7 dated Oct. 8, 2019, 2 pages.X.

* cited by examiner

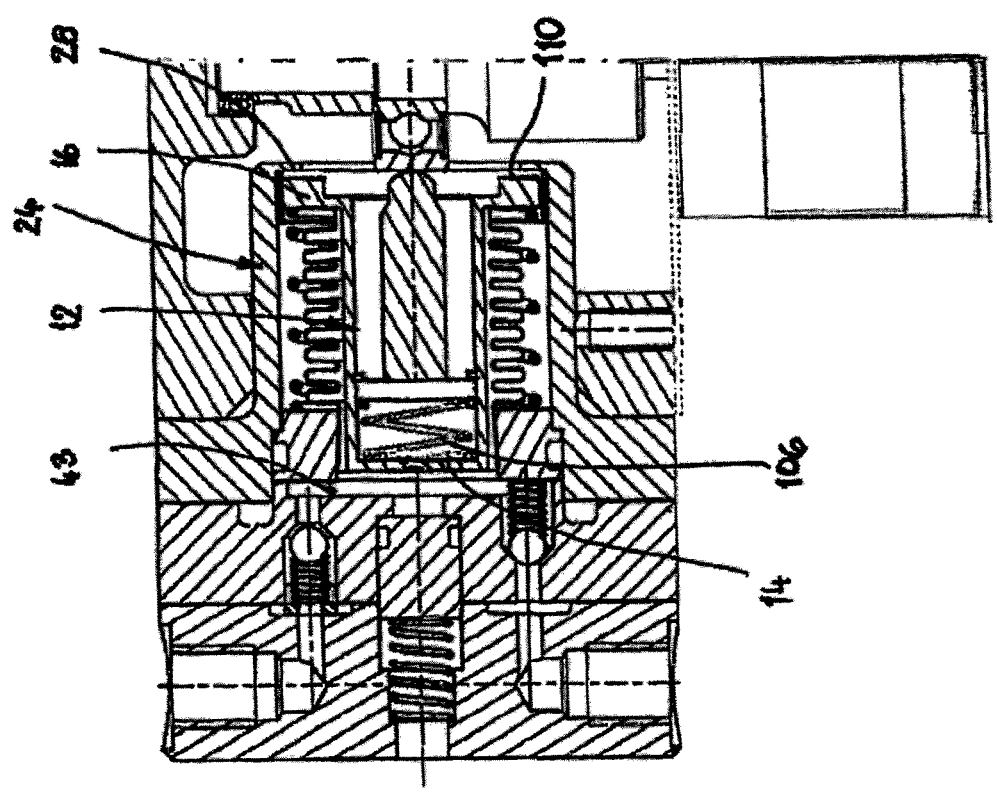

PUMP FOR A SELECTIVE CATALYTIC REDUCTION (SCR) SYSTEM IN VEHICLES COMPRISING AT LEAST ONE PUMP ELEMENT COMPRISING A PUMP PISTON, A SPRING BELLOW, AND AN ACTUATION TAPPET UNDER FORCE OF A COMPRESSION SPRING SURROUNDING THE SPRING BELLOW

FIELD OF THE INVENTION

The invention relates to a pump for an SCR system in vehicles.

BACKGROUND

It is known, at least to reduce the nitrogen oxides contained in exhaust gases of internal combustion engine vehicles by means of a selective catalytic reduction system (SCR procedure). For this purpose an aqueous urea solution will be injected into the exhaust stream in fine dosing steps to reduce the nitrogen oxides. Due to a chemical reaction with the urea solution, the nitrogen oxides will be transformed into nitrogen and water. Pumps are used for pumping the urea solution, like piston pumps, rubber diaphragm pumps, gear pumps, orbital and hose pumps. They are however not robust, so they do not have a long life when used in SCR systems in vehicles. Also, precise dosage of the urea solution is likely very difficult to inject into the exhaust gas stream and hardly possible with them. But, precise dosage is required for a reliable reduction of nitrogen oxides in the exhaust stream.

SUMMARY

The invention is based on the task to design the pump that has a long life time, is robust and has a precise dosage of the pumped medium during the usage which is to be guaranteed.

This problem is solved by the invention according to the generic pump with the distinctive as described and recited herein.

According to the invented pump at least a pumping piston with at least a metal spring bellow is applied. The metal bellow will be elastically deformed during the pumping operation. The metal bellow has a very long service life and optimal durability. This ensures that the pump guarantees precise dosage of the medium to be pumped over the period of its operation. The metallic spring bellow can be used over a wide temperature range, without any disadvantages in relation to the accuracy of the flow rate. The metallic spring bellow is subject to almost no wear, which contributes to the longevity and the optimal dosing accuracy.

Beneficially, the pump piston is a hollow piston, which is surrounded by the spring bellow. As the spring bellow, during the pumping process, is elastic deformed in an axial direction, it supports the axial movement of the hollow piston during pumping.

The spring bellow does limit beneficially a radial pumping space for the pumping medium. Here, the pumping space for the pumping medium can be made between the spring bellow and the mantle of the hollow piston. In this case, the metallic spring bellow seals radial this pumping space to the outwards, so that the pumping medium can be kept safe in the pumping room. Because the metallic spring bellow has distance from the mantle of the hollow piston, direct contact with the hollow piston is not provided, so that the spring bellow is subject to no wear. This design supports the long service life of the pump. Such design reduces the dead volume in an advantageous way. Also, this design has the advantage that the force directly to the pressure surface can be performed.

At another advantageous embodiment, the pumping space for the pumping medium is between the spring bellow and a mantle of a housing part formed. In this case, the spring bellow is built in favorable way with the mantle of the pump piston. The pumping space for the pumping medium is located in this case on the outside of the spring bellow.

The spring bellow beneficially stretches between a ring surrounding the hollow piston and a radial flange of the hollow piston. The spring bellow is attached with one end of his ring and its other end to the radial flange of the hollow piston. The mounting is pressure tight, so the medium between the bellow and the mantle of the hollow piston, from the pumping space cannot accidentally escape to the outside.

The spring bellow can be attached with one end on an axial sliding ring and the other end to a fixed housing ring. Such design is then provided, if the spring bellow is the mantle of the pump piston. In this case, medium is being sucked in or pressurized, by axial shifting, depending on the direction of movement of the ring. Such solution is a simple design of the pump.

The axial sliding ring and the housing fixed ring are preferably coaxed to each other so that the spring bellow between them can be reliably stretched and pulled together.

Preferably, the spring bellow with radial distance surrounds an activation tappet of the pump piston. The spring bellow is with the free end of the activation tappet on an eccentric disc of the eccentric drive. With the pressing plunger, the movement of the pump piston is controlled by the eccentric disc, axially in both directions, to suck the medium and provide pressure for the consumers.

The actuation tappet is beneficially under force of at least one spring.

The spring is a compression spring that surrounds the spring bellow. So no wear occurs, the compression spring surrounds the spring bellow with radial distance. Thus, it is ensured that the spring can reliably move the pump piston, to put medium, being pumped under pressure. On the other hand, the metallic spring bellow can be unhampered elastically deformed, by the compression spring.

In another embodiment, the spring is a compression spring attached on a disk, from which the actuation tappets reaches out. In this case, the compression spring acts on the disc, on the opposite side of the actuation tappet, the disc is sealed so that no media can pass it, in case of the pumping. Beneficially, the disc makes a design at the bottom of the piston, which can create a hollow piston. The disc should be beneficially designed the way that the pumping space is limited to a minimum for the pumping medium.

In another embodiment, the spring is a tension spring which is surrounded by the spring bellow with radial distance. In this case, the tension spring is arranged so that it surrounds the actuation tappets with distance, where the spring is, in distance, surrounded by the metallic spring bellow.

The pumping element is beneficially equipped with at least one pressure valve and a suction valve. Through the suction valve, the medium will be, with a corresponding movement of the pump piston, sucked in the pumping space. The pressure valve is designed here so that it is closed during the intake stroke. Then the plunger moves in the other direction, the medium in the pumping space will be under pressure, which will close the suction valve and open the pressure valve.

Beneficially the pressure valve and the suction valve are very close to the pumping space. This contributes to a compact design of the pump.

Since the pumping medium, in particular the aqueous urea solution freezes up at relatively high temperatures (around −11° C.), the pump is equipped in a more beneficial way with a compensating system, to absorb the occurring volume increase during freezing of the medium. This compensation device is housed in the pumping element. The compensating device ensures that no pump parts will be damaged if the freezing of the medium occurs.

The compensating system has at least a balance piston in favorable way, which partially is limiting the pumping space for the device and it can be moved against a spring force.

The pump is assembled in a particularly advantageous way having individual modules. The modular design allows it assembly of the pump in different assemblies, depending on the different applications of the pump.

The pump elements can be laid out differently.

The pump may exhibit several pumping elements in sequence side by side or are arranged in a star shape applied on the housing. In the sequence design, the pump elements can be applied on one or more sides of the housing and can be provided next to each other. In this case the drive shaft extends through the housing, and in the position of the single pumping elements, each will have an eccentric disc, by which the pump elements can be operated.

When the pump elements in a star shape arrangement on the housing, then a single eccentric disc can be used, with which the radially arranged pump elements are operated. The pump can be very compact designed at such solution. The drive shaft can be short, because the pump elements in the star-shaped are distributed and arrangement on the same level as the housing. The eccentric disc is designed here, so that the various elements of the pump will be activated in a timely order.

The pump elements can be, for example, arranged in the form of opposed elements on the housing.

An advantageous embodiment is the pump being equipped with a freeze protection, which prevents the spring bellow from being damaged or destroyed in a possible freezing of the medium.

This freeze protection is provided with at least a compression spring in a preferred embodiment, which lies on the actuation tappets, on the opposite side facing the pumping space for the pumping medium and is under a preload force. It is larger than the operating pressure of the pump during operation, but smaller than the damaging pressure occurring by freezing of the medium in the pumping space. As long as the medium in the pumping space does not freeze, the spring acts as a rigid component. Freezing the medium in the pumping space up, its volume enlarges and expands. This leads to the result that the compression spring is accordingly elastically deformed and absorbs the resulting from the freezing volume increase of the medium, so that the spring bellow is not damaged.

The compression spring is beneficially protected and housed in a sleeve, which is at least partly surrounded by the spring bellow.

The subject-matter of the application is not only from the subject-matter of the individual claims, but also all information disclosed in the drawings and the description and characteristics. They are, even if they are not covered by the claims, as essential to the invention claimed, insofar as they are either individually or in combination are new compared to the state of art.

BRIEF DESCRIPTION OF DRAWINGS

More features of the invention appears from the further demands/claims, the description and the drawings.

The invention is explained on the basis of some forms of execution, shown in the following drawings.

FIGS. 5 and 5A are a representation according to FIG. 2, a fifth embodiment of the present invention.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The described pumps are used for SCR (selective catalytic reduction systems). With the pump, an aqueous solution of urea is injected in the exhaust system before an SCR catalytic converter of a diesel vehicle to reduce harmful nitrogen oxides in the exhaust gases, or to remove it. The urea solution is added to be dosed by means of the pump, or an injector, so that the nitrogen oxides reliably can be removed from the exhaust or mainly reduced, and that they pose no environmental impact.

Figure 1:
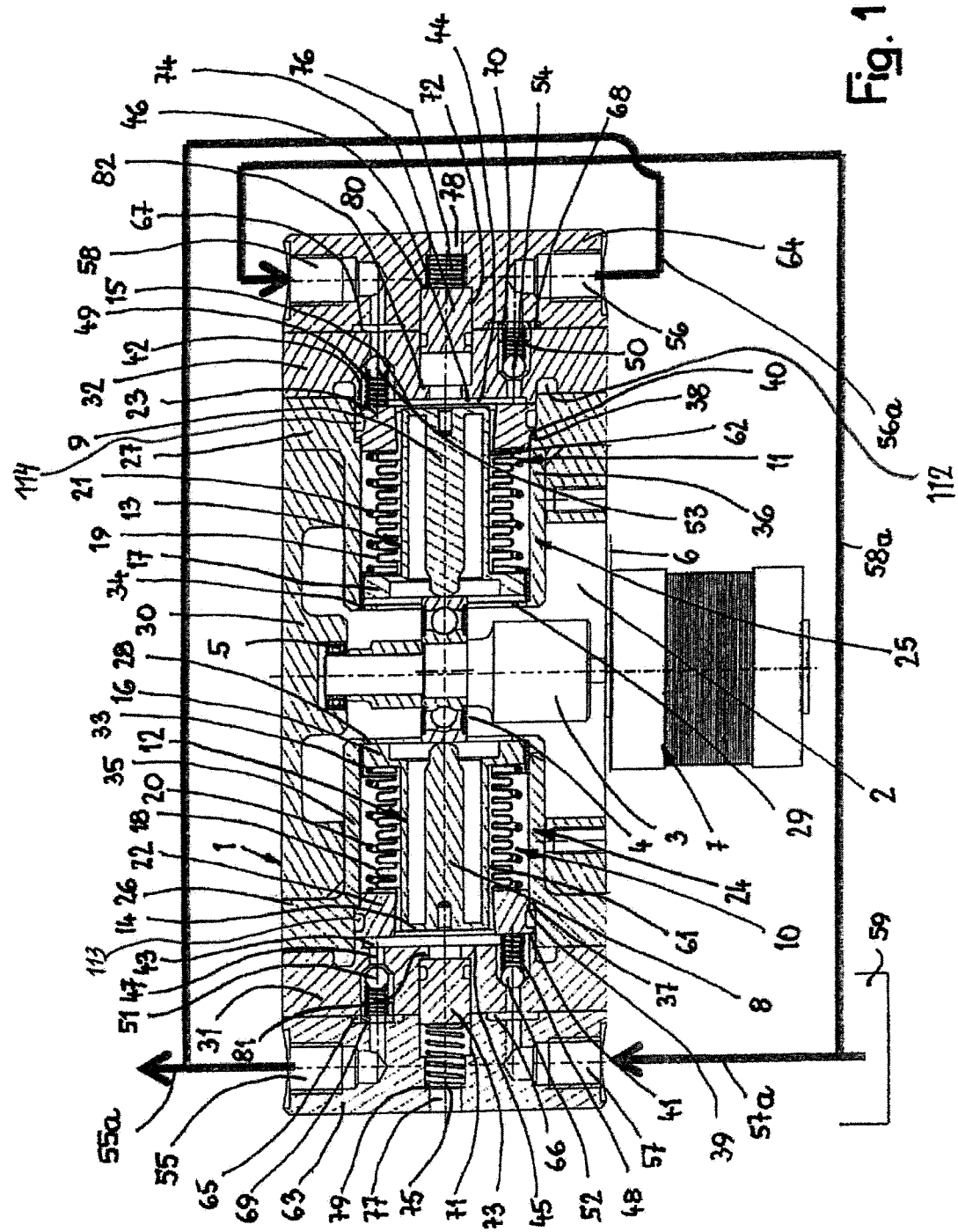
FIG. 1 is a cross section of the pump of the present invention.

The pump in accordance with FIG. 1 has a housing 1. It has a central drive room 2 for a drive shaft 3, which has a fixed eccentric disc 4. The free end of the drive shaft 3 is rotatable based in a bearing 5, which is provided on the inside wall of the enclosure 1. The drive shaft 3 is protruding through a mounting plate 6, from the drive room 2, as well as from the housing 1. An electric motor 7 is attached to the mounting plate 6, which closes the drive room 2 outward, whose motor shaft is the drive shaft 3 and rotates with the eccentric disc 4 during the operation of the pump.

Lubricants for the drive shaft 3 and the eccentric disk 4 are accommodated in the drive room 2. Depending on the execution, also a dry lubrication can be used. In FIG. 1 an outward venting for the drive room 2 is not shown.

The eccentric disc 4 acts with two diametrically opposed actuation tappets 8, 9, which are components of each pump element 10, 11. Both pump elements 10, 11 each have a hollow piston 12, 13, which is open towards the eccentric disc 4. The actuation tappets 8, 9 are with a bottom 14, 15 of the hollow piston 12, 13 connected, preferably in one-single piece designed. The mantle of the hollow piston 13, 14 are surrounded with distance to the actuation tappets 8, 9. At the free end of the hollow piston 12, 13 is an outstanding outward radial flange 16, 17 connected thereto. The radial flange 16, 17, compared to the wall of the hollow piston 12, 13, is thicker in design and serves the surrounding spring bellow 18, 19 as stop for the assembly. It consists of metallic material, so that it has a long life and long durability. The spring bellow 18, 19 is surrounded with distance at least from one compression spring 20, 21, which is supported at the end of the radial flange 16, 17. The other end of the compression spring 20, 21 is supported by the radial flange 22, 23, of the hollow piston 12, 13, surrounded by the radial flange 22, 23 and has distance in the area of bottom 14, 15.

The radial flange 22, 23 has on his radial outer side a ring groove 113, 114, in which a seal ring (not displaced) is assembled. The ring groove 113, 114 seals against the ring flange 26, 27 to the outside.

By way of example shown, by the illustrative example, the hollow piston 12, 13, can be also guided in the radial flange 22, 23.

The pump elements 10, 11 each have a housing 24, 25 formed as a sleeve shaped part. The sleeve has at the end, facing away from the eccentric disc 4, a ring flange 26, 27 outward radial and at the eccentric disc 4 end facing a radial inward ring flange 28, 29. The ring flanges 26, 27 have greater thickness than the ring flange 28, 29. The ring flanges 26, 27 are clamped axial between the housing parts 30, 31 and 30, 32.

The ring flange 28, 29 forms a stop, where the hollow piston 12, 13, with its radial flanges 16, 17 under the force of the respective springs bellow 18, 19 and the compression spring 20, 21 may stop. In extension of the ring flange 28, 29 is on the hollow piston 12, 13 ring flange 16, 17, a plain bearing 33, 34. This allows the hollow piston 12, 13, during the axial movement, to pump the medium and have a reliably movement.

The housing parts 24, 25, with a cylindrical outer surface mantle 35, 36 are connecting/assembled on the inside of the housing part 30. The parts of the housing 24, 25 are correctly aligned in the radial direction, in this way, by the ring flanges 26, 27 in axial directions and through their alignment on the part of the housing 30. The parts of the housings 24, 25, 30 and 32 allow a simple assembly of the pump.

The mantle 35, 36 of the housing parts 24, 25 points at its inside approximately in height of the ring flange 26, 27, a surrounding step 37, 38, on the radial flange 22, 23 with a circumferential shoulder area 39, 40 where it is secured and clamped.

The housing parts 31, 32 are designed with a ring-shaped lead 41, 42, where the radial flange 22, 23 is aligned. Thus the radial flanges 22, 23 are between the steps 37, 38 of the housing parts 24, 25, and the leads 41, 42 of the housing parts 31, 32 secured.

The lead 41, 42 of the two housing parts 31, 32 are in the middle on the front side of the housing parts 31, 32 and are also used for the radial alignment of the housing parts 31, 32 (between) against the opposite housing part 30. The lead 41, 42 and the radial flange 22, 23 are each sealed on the inside wall of the housing parts 24, 25 in the area of the ring flanges 26, 27.

The two annular lead 41, 42 are radial limiting each at a pumping area 43, 44 to the outside, for the pumping medium. The pumping area 43, 44 is limited with a flat bottom 45, 46 axially.

In the bottom 45, 46 of the pumping space 43, 44 are two axial drillings 47, 48; 49, 50 each extending in. The drillings 47 to 50 are closed by valve bodies 51 to 54, which are valve balls under the force of a compression spring in the illustrative example. The drillings 47-50 together with valve bodies 51 to 54 are building check valves, for the pressure valves 47, 51; 50, 54 and suction valves 48, 52; 49, 53.

The drilling of 47, 50 are connected with the pressure connections 55, 56 and the drillings, 48, 49 are connected to the suction connections 57, 58. The suction connection 57, 58 are connected to a tank of 59 in which the pumping medium is located. With the pressure ports 55, 56, the medium is connected to an injector 60 (FIG. 4); there the medium will be injected in a well-known way into the exhaust system of the vehicle.

The spring bellow 18, 19 are surrounding by the hollow piston 12, 13 each with play. Thus, forming a pumping area 61, 62 between the spring bellow 18, 19 and the hollow piston 12, 13, this is in connection with the pumping area 43, 44. The two bellow 18, 19 are sealed to the outside, so that it the medium cannot escape from the pumping area 61, 62.

The eccentric disc 4 is turned by means of the electric motor 7. This will cause a movement of the actuation tappets 8, 9 against the hollow piston 12, 13 at the appropriate angle of the eccentric disc against the force of the spring bellow 18, 19, as well as the compression spring 20, 21. In the opposite direction, the hollow piston 12, 13 are moved by the spring bellow 18, 19 and the force of the compression spring 20, 21 always so charged, that the actuation tappets 8, 9 at the circumference of the eccentric disk 4 are aligned. The ring flanges 28, 29 of the housing parts 24, 25 are limiting the axial movement, if needed, of the hollow piston 12, 13 in the direction of the eccentric disc 4.

The two check valves of each pumping element 10, 11 are arranged so that one check valve will close when it is pressurized and the other check valve will close when the suction pressure in the belonging lines occurs.

The hollow piston 12 of in FIG. 1 of the left pump element 10 starts from the bottom dead center of the eccentric disc, the medium in the pumping space 45, 61 will be set under pressure. This has the consequence that the valve body 51 will lift against spring force, the valve seat will open, so that the medium can flow via the drilling 47 in the pressure connection 55. The valve body 52 is pressed as a result of the pressure exerted on the medium in the valve seat, causing the valve body 52 to close the suction port 57.

In the same way the pumping element 11 on the right side will proceed, if the hollow piston 13 starts to move the valve body 54 will open in the release position, so that the medium will be pressurized in the pumping area 46, 62. This causes the medium to flow via the drilling 50 to the pressure connection 56. The other valve body 49 will be moved into the valve seat by the pressure and close the suction port 58.

When the hollow pistons 12, 13 are moving from the top dead center back to the bottom dead center, in the pumping area 43, 61; 44, 62, a vacuum pressure will happen, which leads to the fact that the valve body 52, 53 are lifting the valve seat, so the suction port 57, 53 will open. Thus, the medium is sucked in from the tank 59 in the pumping area 43 61; 44, 62. Caused by the suction pressure, the valve body 51, 54 will be pushed, together with the compression spring force, in the valve seat and the pressure connection 55, 56 will be closed during the suction phase.

In the described way the suction ports 57, 58 or the pressure ports of 55, 56 will be alternately opened and closed. During suction operation, the valve body 51, 54 will lock the pressure ports, 55, 56, while the valve body 52, 53 will close the suction ports 57, 58, if medium being pumped through the hollow piston 12, 13 is pressurized.

The spring force acting on the valve bodies 51 to 54 is tuned to the pressure conditions of the pump, so that the valve body reliably closes the corresponding pressure—and suction connections alternate opens. The check valves of both pump elements 10, 11 are beneficial alternately activated. At the pressure ports 55, 56 are the pressure pipes 55a, 56a connected and are merged. 55a, 56a pressure pipes can be external lines. It is also possible to make the pressure lines 55a, 56a with through-holes in housing 1. In the same way, also, the suction connections 57, 58 can be connected to the suction pipes 57a, 58a, as well in external pipes or drillings in the housing.

The pressure connections 55 and suction connection 57 are in a housing part 64 in a housing part 63 and the pressure connection 56 and 58 are suction connections. Both housing parts 63, 64 are roughly cube-shaped or round and are by their sides facings aligned to the housing parts 31, 32 and are fixed to these body parts in an appropriate manner, preferably over screws.

All parts of the housing are beneficially so designed that they form a joint outside of the housing 1. The housing 1 and consequently the entire pump is assembled with individual modules, so that different types of pumps can be created depending on the application.

The pump works, as described before, in such a way that by pulling back the spring bellow 18, 19 the medium from the tank 59 is sucked in. The pulling back of the spring bellow 18, 19 is activated by the compression spring 20, 21, which is designed such that the actuation tappets 8, 9 of the two pump elements 10, 11 are always in contact with the eccentric disc 4. The lubrication of the mechanical drive components can be achieved through an oil sump or a dry lubrication.

Preferably, the pump is driven via the electric motor 7, which is preferably a brushless electric motor which guarantees a long service life. If no durability is required, the electric motor 7 can also be with brushes equipped.

The electric motor 7 is beneficially adjustable. Then, the flow rate of the medium can be set variably. The flow rate can be adapted so that the injectors 60 can be demanded-based delivery controlled. This can lead to save energy in the system and prolongs the life of the pump. The eccentric disc 4 can be powered, as well, optionally directly from the combustion engine of the vehicle.

Due to the compression of the spring bellow 18, 19 the volume of the pumping space 61, 62, that is enclosed by the spring bellow 18, 19, will be reduced and the medium will flow via the open valve to the pressure ports 55, 56. During this phase of the pressurization, the suction connections 57, 58 are closed, through the appropriate valves.

The two housing parts 63, 64 are on their alignment side with two cavities 65, 66; 67, 68 provided. It is in height of the valve body 51 to 54. In the cavities of 65 to 68, a sealing ring 69, 70 is located, as a consequence, the two housing parts 31, 63 and 32, 64 will be sealed against each other at the location of the cavities.

The pump is fitted with a device which prevents damage to the pump components in freezing conditions of the medium. The housing parts 31, 32 are designed with a central drilling 71, 72. In the drillings 71, 72, a balance piston 73, 74 is sealed located which is forced by at least one compression spring 75, 76 in direction to the pumping elements. The compression spring is located in the drillings 77, 78 of the housing 63, 64. The drillings 71, 72 and 77, 78 have the same diameter, thus the compensation piston 73, 74 can be moved into both drillings 71, 72; 77, 78.

The compression springs 75, 76 are supported with their opposite side from the pumping element 10, 11 at the end of a ring shoulder 79, 80 in the wall of the holes 77, 78. The other end the compression springs 75, 76 is located on the balancing piston 73, 74 and pushing it against a stop 81, 82, who by one radial, to the inside directed ring flange at the end of the hole 71, 72 of the housing part 31, 32 is made.

The holes 71, 72 are connected to the pumping space 43, 44. The drill holes 77, 78 of the housing parts 63, 64 are open to the environment.

Should the medium freeze in the pumping space 43, 44, then the expansion of the frozen medium is compensated by the extension of the balancing piston 73, 74 against the force of the compression springs 75, 76 as they are pushed back, increasing the available pumping space for the media. As a result, the pump parts in freezing medium in the pumping spaces, 43, 44 and around are safely protected from damage.

The force of the springs 75, 76 will be adjusted so that the balancing piston 73, 74 during normal operation of the pump cannot be moved. Advantageously, the spring force is set to about 20% above the operating pressure of the pump.

The balance piston 73, 74 can be used as a pressure relief valve. In this case, the balance piston works with a connection drilling 109 together (FIG. 4a), which can be brought in conjunctions with the suction port 57, 58. The springs 75, 76 is designed so that after reaching a predetermined pressure in the pumping space 43, 44 the balance piston 73, 74 so far will shift, that the over pressure will be released via the connection drilling 109 from the pumping space 43, 44 into the suction port 57, 58.

The balance piston 73, 74 can also dampen the pressure oscillations which may be able to occur within the pump and valves.

The actuation tappets 8, 9 of the two pump elements 10, 11 have an interface surface fitting the design needs to the interface to the eccentric disc, for example, a round shaped or flat surface. This guarantees a proper mechanical connection and movement of the hollow piston 12, 13 and the pumping elements 10, 11.

Figure 2:
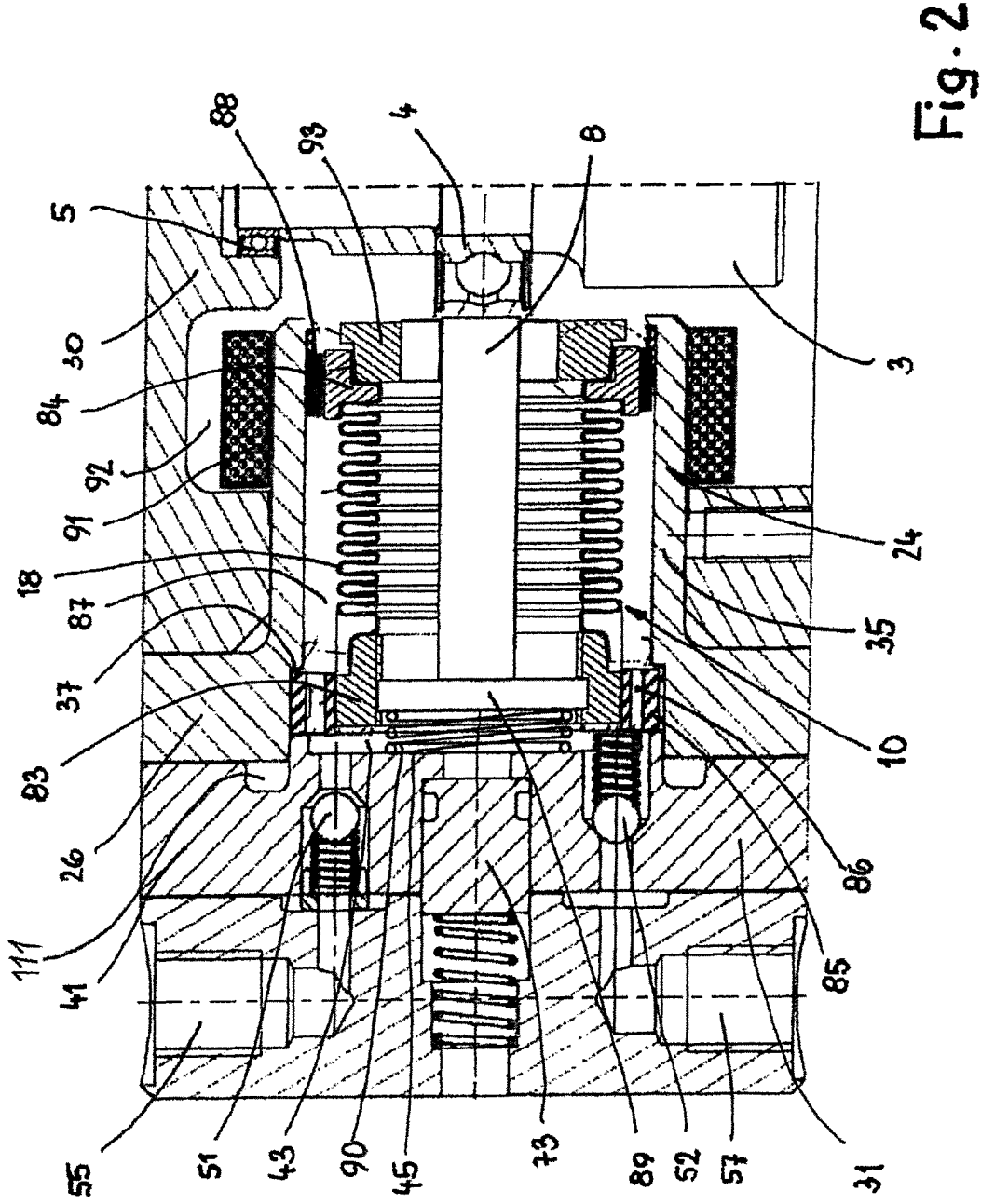
FIG. 2 is a cross section part of a second embodiment of the present invention.

In the form of execution in accordance with FIG. 2, only one half of the pump is shown. The other half is the same as shown in the previous execution and is mirror-symmetrical with respect to the axis of the eccentric disc 4, like in the previous embodiment rotary fixed onto the motor shaft 3.

The pump element 10 has the hollow piston 12; its mantle is made of the spring bellow 18. The two ends are medium-tight with each having a connection ring 83, 84 which is connected to the spring bellow 18. The connection ring 83 is surrounded by a ring-shaped guide element 85, that is sealed on the inside wall of the ring flange 26 of the housing part 24. The guiding element 85 has at least one, preferably several thru drillings 86 around the circumstances distributed and arranged on. They connect the pumping space 43 with a spring bellow 18 surrounding pressure room 87, which is limited radial outward through the mantle 35 of the housing part 24.

A further and different sealing for the pump space 43, 44 is possible, while in a ring grove 111 (FIG. 2) and 112 (FIG.

1), on the side of the ring flange 26, 27 of the housing part 31, 32 a seal ring (not displaced) is inserted.

The guide element 85 is axial secured between the annular step 37 of the housing part 24 and guided by the annular ledge 41 of the housing part 31.

The connection ring 84 is surrounded by a ring 88, guiding, sealing of the housing part 24 on the inside wall of the mantle 35 and seals the pumping space 87 towards the eccentric disc 4.

The connection ring 83 is fixedly connected on the connection ring 89, which further is linked and fixed to the actuating tappet 8. The actuating tappet 8 is centered on the connection disc 89 and is forced by the compression spring 90 against the eccentric disc 4.

The spring 90 is in the pumping space 43 and supports itself with an end at the bottom 45 of the pumping space and the other end to the bottom of the connection disc 89.

On the outside of the mantle 35 of the housing part 24 is located a heating element 91, which is preferable designed all the circumstance around of the mantel 35, and is located approximately in height of the connection ring 84.

The middle of body part 30 has an area for the heating element with a ring groove 92, in which the heating element is placed. The medium in the pressure chamber 87 can be heated with heating element 91.

The heating element 91 may also be the embodiment according to FIG. 1 as well as in the other forms of execution.

Adjacent to the eccentric disc 4 are positioned connection ring 84 sitting on a fixed mounting ring 93, with which it is linked. The fixing ring 93 surrounds the actuation tappet 8 with distance and leads him through radial gradient bars when it is moved. The fixing ring 93 seals the medium to the outside.

As soon as the actuation tappets 8 is moved to the left by the eccentric disc 4 in FIG. 2, the connection ring 83 is also moved to the left side, which will extend the spring bellow 18. The medium in the pumping space 43 is pressurized; the valve body 51 opens the valve seat. The pressurized medium can now flow into the pressure connection 55 and from there into the pressure pipe. The ball valve 52 is pressed through the pressurized media in its seat, so that the suction port 57 is locked. Through the openings of the connection ring 83, also the medium in the pressure chamber 87 will be under pressure.

Continue turning the eccentric disk 4, the actuation tappets 8 will, under the force of the pressure spring 90 in FIG. 2, move to the right, where the connection ring 83 will be moved as well. The spring bellow 18 can relax, which in the pumping space 87, as well as in the pumping space 43 creates a vacuum. This ensures that the valve body 52 of the valve seat lifts off and opens the suction port 57. Thus, the medium from the tank 59 (FIG. 1) can be sucked in. The spring pressure acting force on the valve body 51 is so great, that when the vacuum occurs the valve body 51 will be closed, thus the pressure connection 55 is disconnected.

In general, the pump in accordance with FIG. 2 is just like the embodiment according to FIG. 1. The pump also has a feature to avoid damage to the pump parts during freezing of the medium. This establishment has a balance piston 73, which is designed and arranged according to the previous embodiment. The heating element 91, that advantageously is a circumferential heating tape, helps to keep the medium, even when outside temperatures are low, liquid. The heating element 91 is also used to provide faster operating capability. If the system frozen, the urea is provided by the thawing in a short time available. Thereby the NOx reduction is quickly available.

The pump in accordance with FIG. 2 can be designed so that the fixing ring 93 is moved together with the connecting ring 84 while the connection ring 83 is fixed. Such a design can eliminate the actuation tappet 8.

Figure 3:
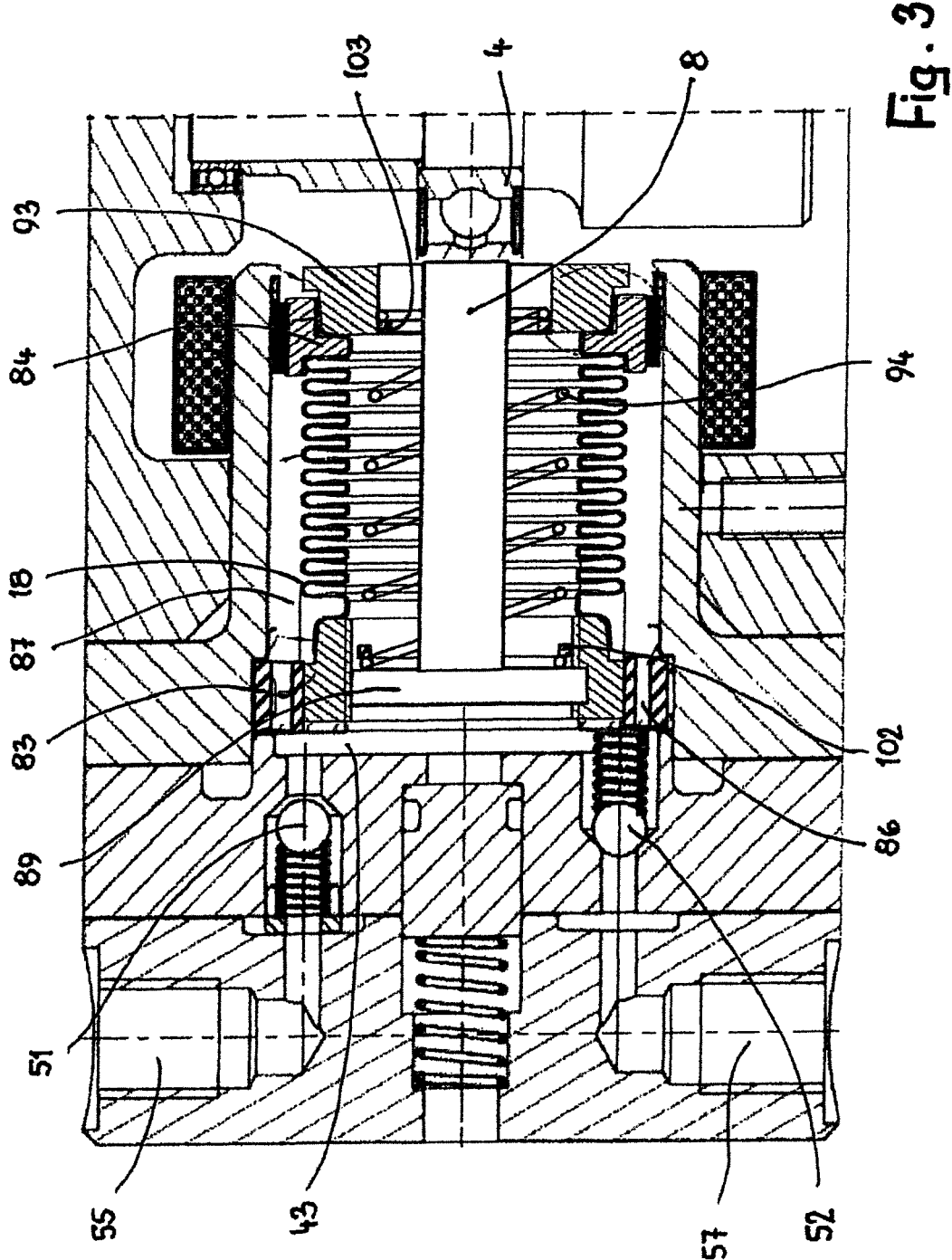
FIG. 3 is a representation according to FIG. 2, a third embodiment of the present invention.

The pump in accordance with FIG. 3 (only one half shown) differs from the pump after FIG. 2 only by having instead of a compression spring 90, a tension spring 94. The tension spring 94 is surrounded by the spring bellow 18 with distance and is designed so that it always pulls the actuation tappets 8 against the eccentric disc 4. Therefore, the end, of the opposite side of the eccentric disc 4, of the tension spring 94 is attached to the fixing ring 93. The other end of the tension spring 94 is attached to the fixing ring 89. The tension spring 94 ensures, as well as the compression spring 90, that the actuation tappets 8 always is in alignment with the eccentric disc 4. To ensure the force and the mechanical connection of the tension spring 94 to the rings, beneficially on each end a snap ring 102, 103 is in place.

If the actuation tappets 8 by the eccentric disc 4 in FIG. 3 moves to the left, then the connection ring 83 will be moved as well. This will pressurize the medium in the pumping space 43 and through the drillings 86 from the connection ring 83 also in the medium in the pressure room 87. The pressure valve with the valve body 51 will open, caused by the pressure; the medium thus will flow to the pressure connection 55. At the same time the valve body 52 of the suction valve will be closed and pushed in the valve seat, the suction connection 57 is locked.

Due to the axial movement of the actuation tappet 8, the tension spring 94 will be stretched as well as the spring bellow.

Caused by turning of the eccentric disc 4 in FIG. 3, the actuation tapped 8 can be moved to the right, and the tension spring 94 with the fixing ring 89 will push the actuation tapped 8 to the right. The connection ring 83 will be taken along as well. The spring bellow 18 contracts accordingly.

Due to the vacuum caused by the extension of the pumping space 43, 51, the pressure valve closes and opens the intake valve 52, so that media can be sucked from a tank 59.

Also in this form of execution, the fixing ring 93, can together with the connecting ring 84 be moved, while the connection ring 83 is in fixed position. The actuation tappets 8 can be omitted in this case.

In addition, this form of execution is equally designed as the embodiment according to FIG. 2.

Figure 4:
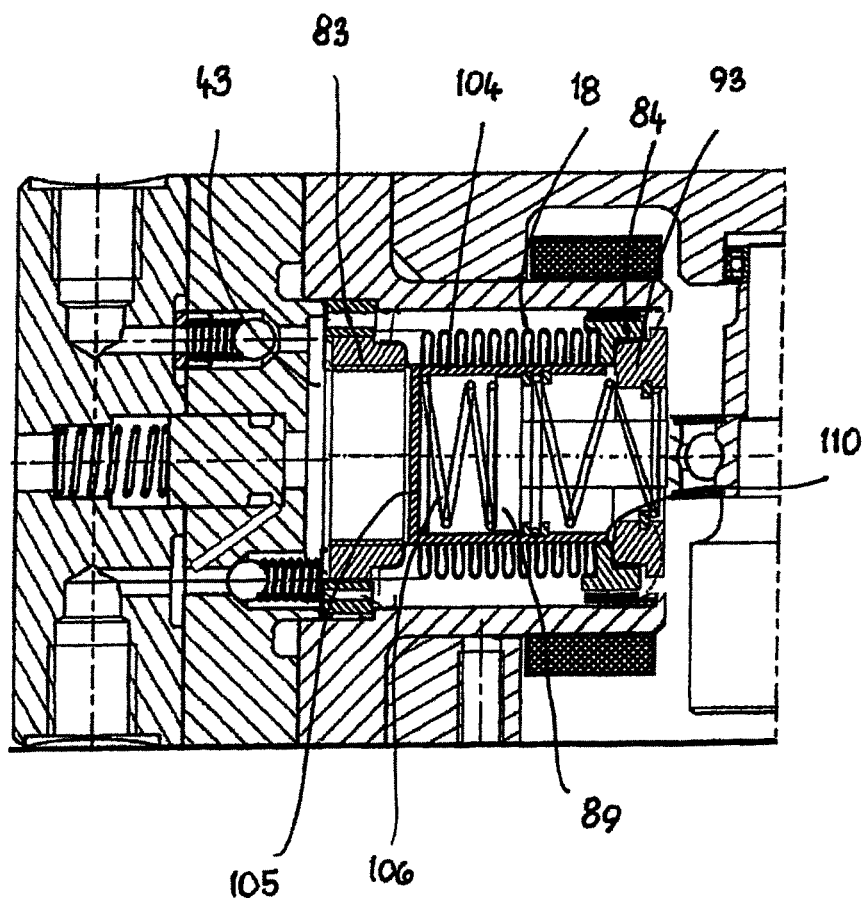
FIGS. 4 and 4A are a representation according to FIG. 2, a fourth embodiment of the present invention.
Figure 4A:
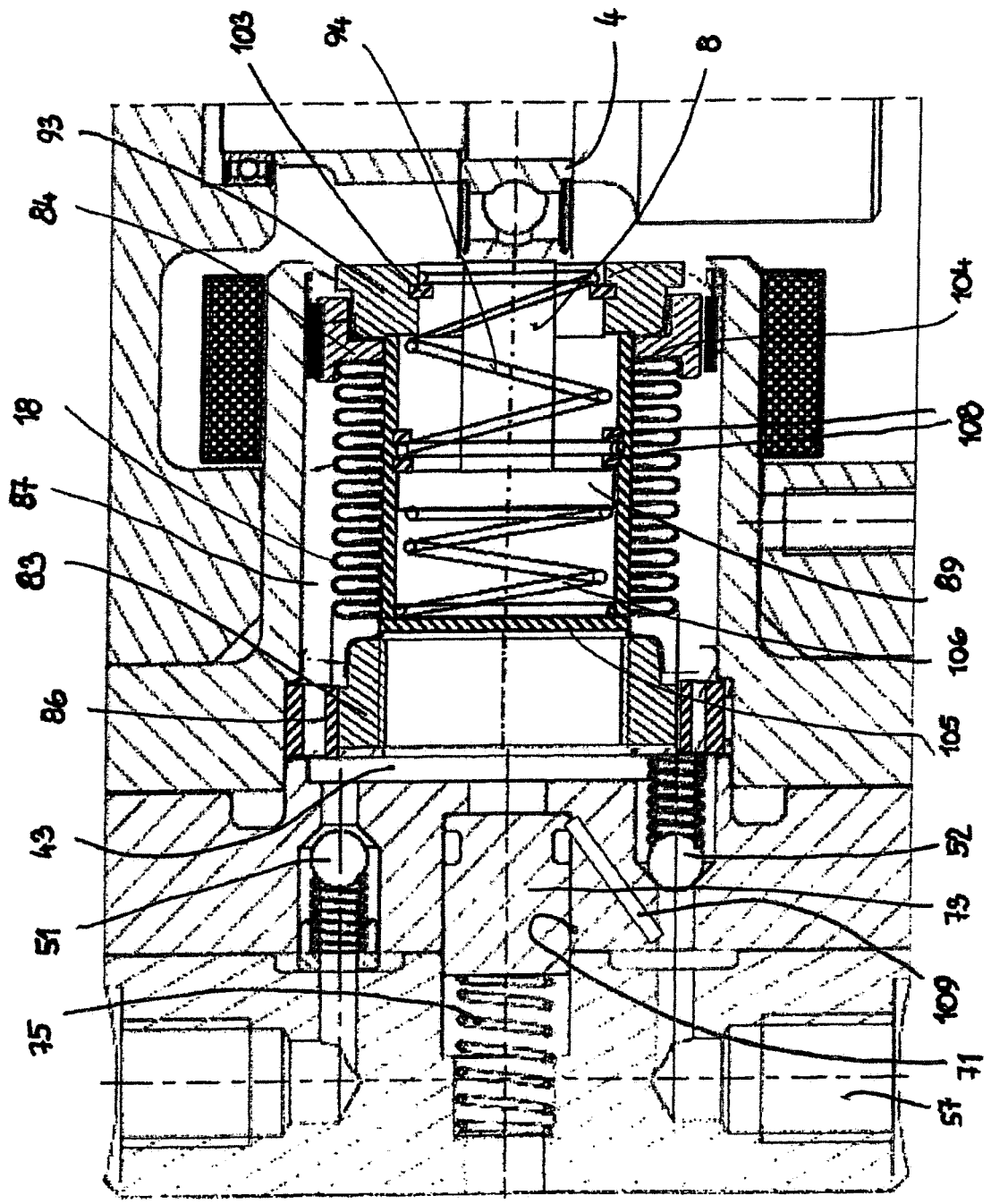

FIGS. 4 and 4a (only one half shown) shows an execution example of a pump, which has the basic structure in accordance to FIG. 2, has, in which the pressure outside of the spring bellow 18 is produced. In addition, this pump is equipped with a freeze protection for the spring bellow 18, connected to the connection ring 83 with one end and to the fixing ring 84 at the other end, which in the described manner is connected to the fixing ring 93 and is not moveable in the pump.

The spring bellow 18 surrounds a sleeve 104 within the piston disc 89 is movable. The sleeve 104 is closed with the plate 105, facing the side of the balancing piston 73. Between this closing plate 105 and the piston disc 89, is a compression spring 106 in the sleeve 104 housed, with its both ends between the closing plate 105 and piston disc 89. The preload of the compression spring 106 is greater than the working pressure of the pump. Thus, the compression spring 106 does not move under normal operation conditions.

The tension spring 94 is located on the opposite side of the compression spring 106, and piston disc 89, where one end is axial located between two retaining rings 108. The other end of the tension spring 94 is axially supported on the retaining ring 103 according to the embodiment to FIGS. 3 and 4*a* on the inside of the fixing ring 93. The tension spring 94 surrounds the actuation tappet 8, firmly associated with the piston disc 89 with distance, according to the previous embodiment. The actuation tappet 8 is with its free end aligned to the eccentric disk 4 in the manner described.

If the actuation tappet 8 when turning the eccentric disk 4 in FIG. 4, is moved to the left, the connection ring 83 moves over the compression spring 106 and the end plate 105 to the left, which will set the medium in the pumping space 43 under pressure. Through the drillings 86 in the connection ring 83, the medium in the pressure chamber 87 is under pressure as well. Because the preload of the compression spring 106 is greater than the operating pressure, the compression spring 106 is a rigid element between the piston disc 89, the end plate 105 and the connection ring 83.

As described on the basis of the last embodiments, the valve body 51 will lift from his seat while the valve body 52 is pressed into his seat, caused by the pressure.

If the eccentric disc 4 further rotates, the sleeve 104 and the piston disc 89, will be retracted together through the tension spring 94, which relaxes the spring bellow 18.

The piston disc 89 will be charged by the compression spring 106 in direction to the circle clip 108.

Due to the vacuum through the extension of the pumping space 43, the pressure valve 51 will be closed in the described way and intake valve 52 will open, so that the medium can be sucked from a tank 59. Also, at this phase of the withdrawal, the compression spring 106 is a rigid component between the end plate 105, the sleeve 104 or the connection ring 83.

The spring 106 forms a freeze protection, which prevents damaging of the spring bellow 18 in freezing of the medium. Should the medium freeze in the pumping space 43 and accordingly extend the volume, the compression spring 106 can absorb the expansion of the frozen medium by deforming elastically. This has the consequence that the spring bellow 18 can move towards the eccentric disc 4, which reliably prevents a damage of the spring bellow 18. The compression spring 106 preload is adjusted so that it is on the one hand higher than the normal operating pressure, but significantly smaller than the maximum damaging pressure/forces resulting from the freezing of the medium.

FIG. 4 shows the location of the sleeve 104 if the medium in the pumping space 43 is not frozen. Then the tube 104 has an axial distance from the mounting ring 93. Between the front side of the sleeve of 104 and the mounting ring 93, a balance room 110 is formed in this way.

Should the medium freeze in the pumping space 43, then it expands.

The disc 105, which can be one part with the sleeve 104, is then charged by pressure. The pressure resulting from the freezing is greater than the pressure of the pressure spring 106, which is elastically compressed as a result.

The sleeve 104 slides across over the piston disc 89. In this way, the increase in volume of the fluid caused by freezing can be absorbed without damaging the spring bellow 18, the sleeve 104 is associated with the spring bellow 18 and hence also with the connection ring 83, to transfer the hoist power to the spring bellow 18. The sleeve 104 can be technically also directly connected to the connection ring 83. This leads to a further reduction of the dead volume in the pumping space 43, if the disk 105 is attached to the left end of the connection ring 83. If the sleeve 104 is moved, it will be guided in the connection ring 84.

FIG. 4*a* shows the sleeve of 104 in its most shifted position in which it lies on to the mounting ring 93 with their face. The size of the compensation room 110 or the axial distance between the front of the sleeve 104 and the mounting ring 93 has been chosen so that the increase in volume resulting from freezing of the medium in the pumping space 43 can be absorbed in any case.

The compressing spring 106 further can reduce occurring hydraulic pressure and pressure peaks during operation, which could damage the spring bellow 18.

The described freeze protection for the spring bellow 18, like in the described embodiment, may be provided with a pump where the pressure is produced outside at the spring bellow 18. The freeze protection can also be provided in pumps where the pressure inside of the spring bellow 18 is produced, as example on the basis of FIG. 1 has been described.

FIG. 4*a* shows that in connection with in FIG. 1 mentioned connection drilling 109 that it connects the inlet drilling 57 with the drilling 71, in which the balancing piston is housed. The balance piston 73 charging compression spring 75 is designed so, that the balancing piston 73 is so far shifted after reaching the maximum allowed pressure in the pumping space 43, that the balance piston shifts his position, that the pumping space 43, with the connection drilling 109 is in flow association to the suction port 57.

Figure 5A:
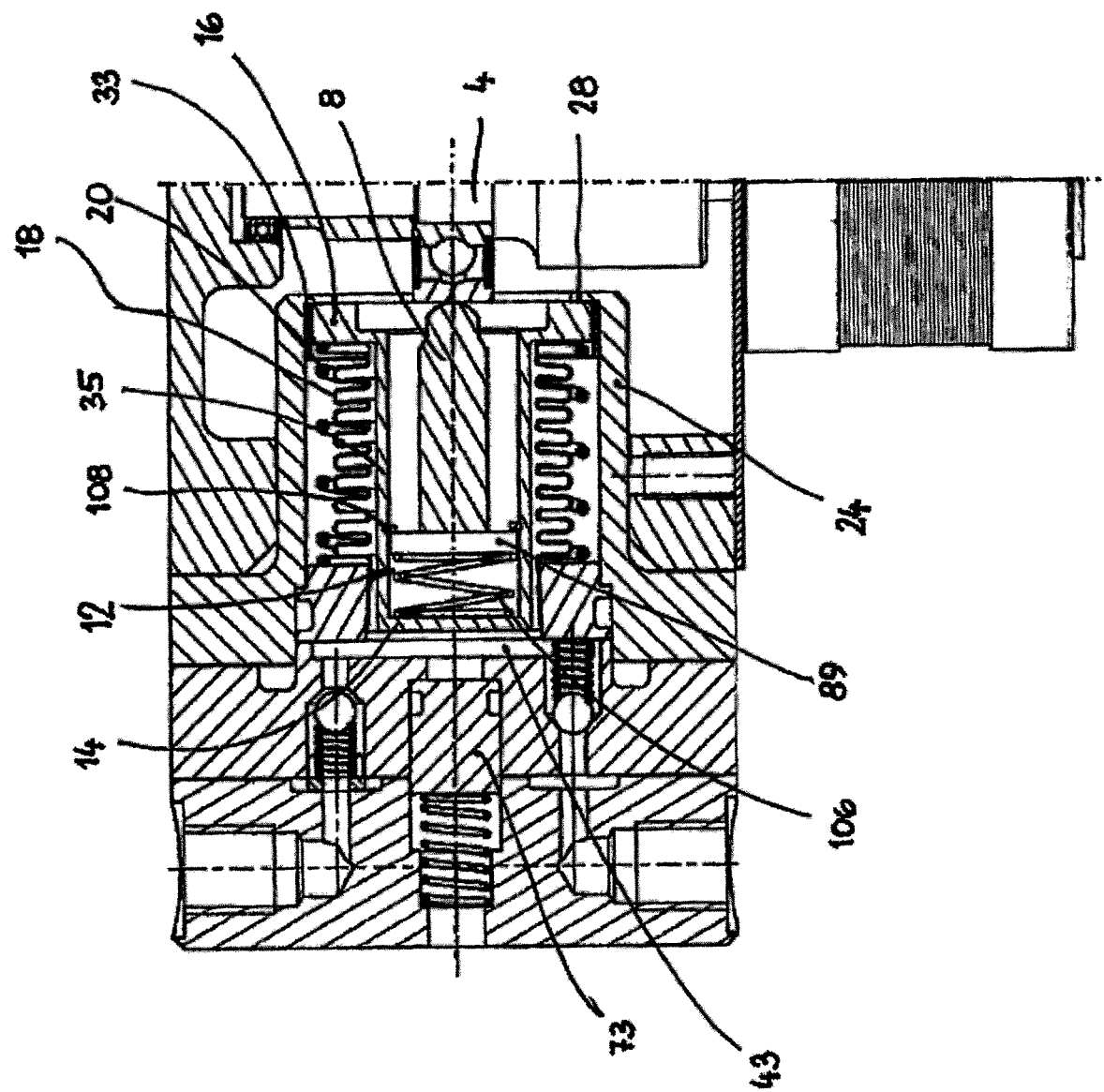

FIGS. 5 and 5*a* (only one half of the pump is represented) shows a pump, on which the pressure generation takes place within the spring bellow 18. The pump has basically the same execution as the embodiment according to FIG. 1. On the inside of the mantle 35, a retaining ring 108, which is according to the previous embodiment is located in a groove on the inside of the mantle 36. At the bottom 14 of the hollow piston 12 facing side of the retainer ring 108 lies the piston disc 89 under the force of the compression spring 106. The other end of the compression spring 106 is supported by the bottom 14 of the hollow piston 12. According to the previous embodiment, the preload of the spring 106 is higher than the pressure in the normal operation of the pump. Therefore, the compression spring 106 is a rigid component, which does not move when the pump works in normal operation conditions. If the actuation tappets 8 by the eccentric disc 4 in FIG. 5 move to the left, the hollow piston 12 under the elastic compression of spring bellow 18 is displaced and the medium in the pumping space 43 is pressurized. Therefore, the compression spring 20 will be elastically compressed in the manner described. Continuing turning of the eccentric disk 4, the hollow piston 12 will be through compression spring 20 in FIG. 5 moved back to the right. The compression spring 106 is not moved during the move of the actuation piston 8.

Should the medium in the pumping space 43 freeze, it expands. This expansion of the freezing medium is absorbed by corresponding elastic deformation of the compression spring 106, so that the spring bellow 18 is not damaged.

If the medium in the pumping space 43 is not frozen, the radial flange 16 of the hollow piston 12 has axial distance from the ring flange 28 of the housing part 24 (FIG. 5). Thus, the balance room 110 is formed between the radial flange 16 and the ring flange 28. Should the medium in the pumping space 43 freeze and thus generate an axial pressure on the bottom 14 of the hollow piston 12, the hollow piston 12 is axially moved to the right. The compression spring 106 is adjusted so that her pressure is less than the damaging pressure of the freezing, but larger than the normal operating pressure of the pump.

FIG. 5a shows the hollow piston 12 in the final position, where radial flange 16, on the ring flange 28 of the housing part 24 stops. The radial flange 16 is guided in the bearing 33. The axial distance between the radial flange 16 and the ring flange 28 and thus the size of the compensation room 110 are chosen so that the freezing of the medium in the pumping space 43 occurring in maximum increased volume can be absorbed.

The compression spring 106 is during normal operations of the pump, like in the previous embodiment, a rigid component, because the preload of the compression spring 106 is greater than the normal operating pressure.

The pressure spring 106 acts as a rigid element between the piston disc 89 and the bottom 14 of the hollow piston 12.

In addition, the pump is in accordance with FIG. 5 equally designed as the embodiment according to FIG. 1.

Figure 6:
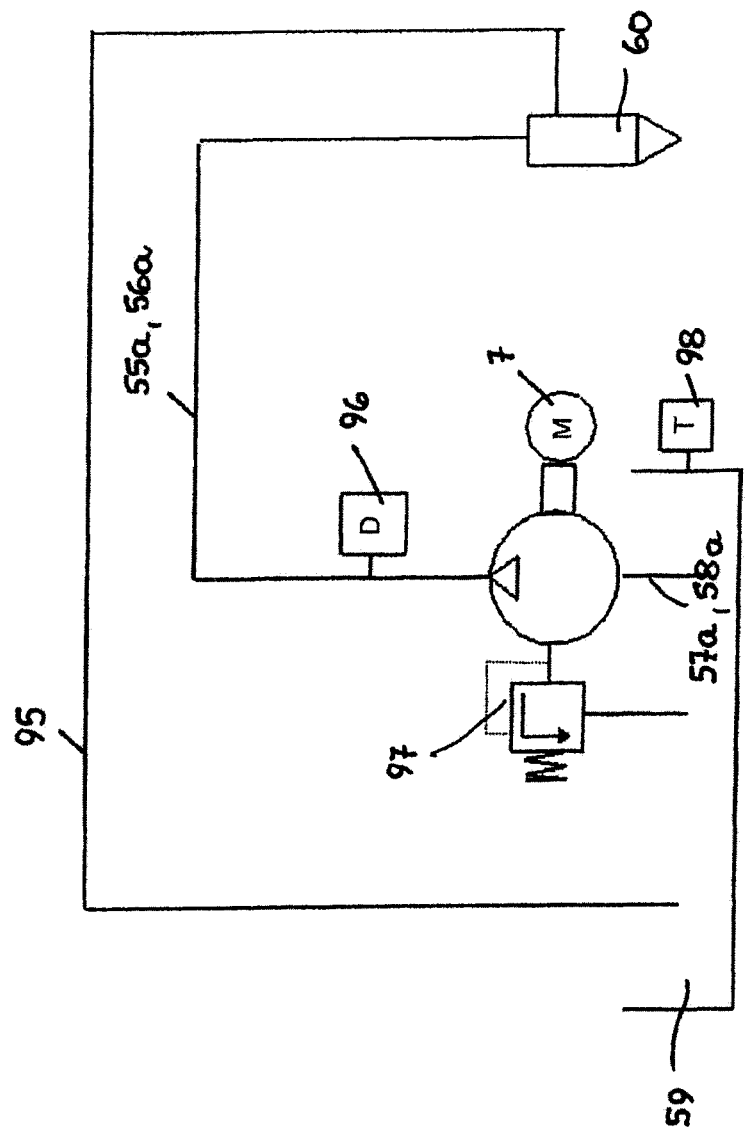
FIG. 6 is a hydraulic circuit of a SCR system that contains a pump of the present invention.

On the basis of FIG. 6 describes the hydraulic circuit of the pump system. With the pump, having optional one of the before described executions, it will suck the medium via the suction lines 55a, 58a from the tank 59 to promote it. The pump is driven by the electric motor 7 in the manner described. The medium is on the pressure line 55a, 56a led to the injector 60.

The injector 60 is connected, via a return line 95 with the tank of 59, so that excess medium via the return line 95 can be returned to the tank 59.

The back guided medium serves mainly for the cooling of the injector 60. Basically the cooling system depends on the system set up. Not all injectors 60 need a cooling system. Some of the injectors 60 are also cooled by air ventilation. The cooling by means of the media is optional.

In the pressure line 55a, 56a, a pressure sensor 96 is advantageously set, and it can be used to monitor the pressure in the pressure line. The pressure signal is used to monitor the system. At a pressure drop, a warning is generated, for example, in the form of a flashing signal lamp, so that the driver is advised of a possible failure of the pump. Further, the pressure control is used to set up a precise injection of the urea. The data to achieve the precision of the injection is stored in the control logic.

Eventually the pressure sensor 96 can be used, exceeding a tolerable pressure level to open a pressure relief valve 97 that is connected to the pump, to reduce the high pressure from the pressure line 55a, 56a. The medium is fed to the tank 59 at the pressure relief valve 97, as long the pressure relief valve is open.

Beneficial is to record the temperature of the medium in the tank 59 by a temperature sensor 98. It can also be used to protect the pump at low temperatures. If the pump should be frozen, the temperature sensor 98 generates a signal so that the pump does not start. The temperature sensor 98 can be used also for the compensation of temperature effects on the functional components of the pump, or such as, for example, the injector 60, so that they are kept at a certain temperature or in a certain temperature window.

Figure 7:
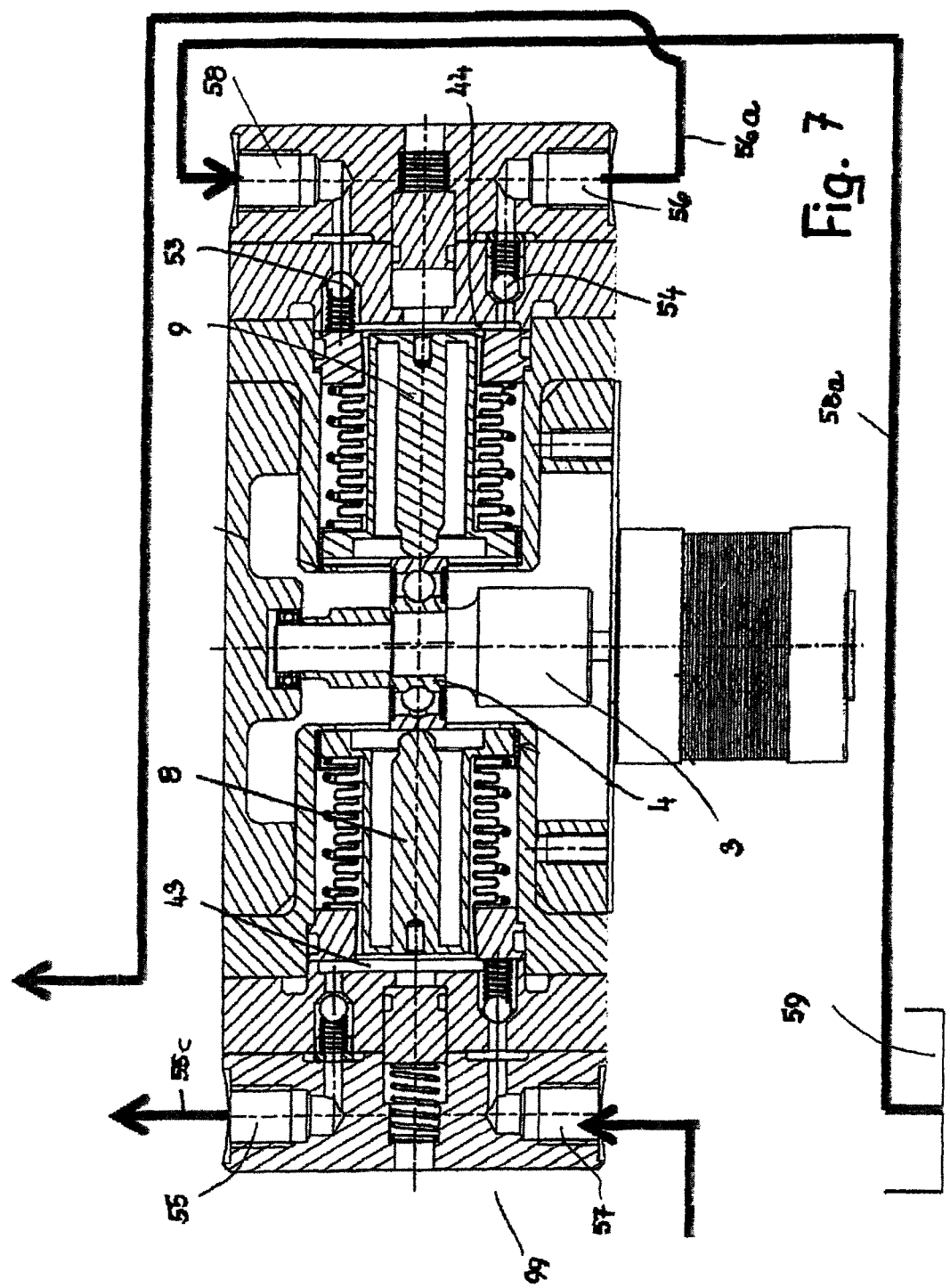
FIG. 7 a representation according to FIG. 1, a sixth embodiment of the present invention.

FIG. 7 is an example of a pump, which can pump two different media. In the shown example, air and urea can be pumped. The pump itself is equally designed as the embodiment according to FIG. 1. The medium of urea is located in the tank 59 and is fed through the suction line 58a to the inlet port 58 in the manner described. To operate the actuation tappets 9 by means of the eccentric disc 4, the urea in the manner described, is sucked into the pumping space 44 when valve body 53 lifts off the valve seat and is open, set under pressure and with lifted off valve body 54, the medium will flow to the pressure connection 56.

From here, the urea is fed in the pressure line 56a to the injector 60.

The suction port 57 is part of the second element of the pump which is designed as a compressor pump. Through the suction port 57, air is sucked in from the atmosphere. Actuating the actuation tappets 8 with means of the eccentric disc 4 with the manner described, the medium will be sucked in the pumping space 43 and via the pressure connection 55 pumped into the air pressure line 55c. Compressed air will be delivered to the respective injector 60.

Since in the different SCR systems, the amount of air and urea is different, the pump can be adjusted with different eccentric disc 4 strokes. The amount change for the injection during operation can be changed by changing the RPM of the motor 7. For example, two different eccentric discs can sit on the drive shaft 3, which are so designed that the actuating tappets 8, 9 have a different stroke, therefore different amounts of urea and compressed air are available for the injector 60.

Figure 8:
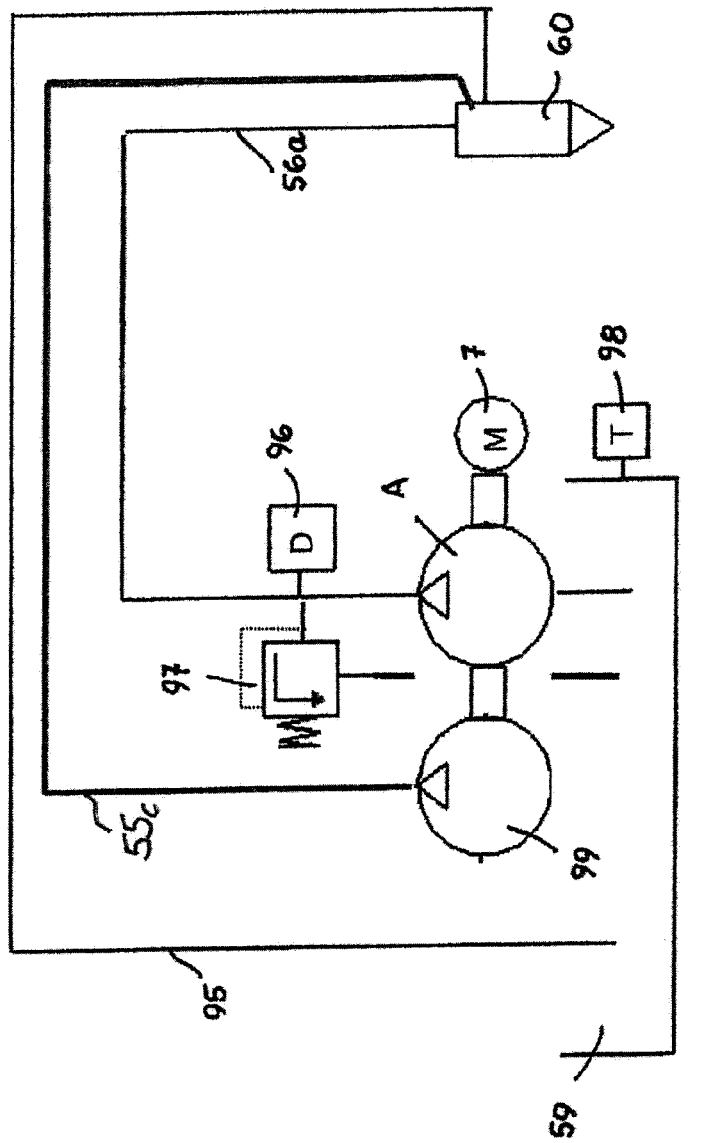
FIG. 8 is a hydraulic circuit of a further embodiment of a SCR system with the invention of the pump in accordance with FIG. 7 of the present invention.

FIG. 8 shows the hydraulic circuit of the pump in accordance with FIG. 7. The pumping element 99 is for example designed as a compressor pump.

Both pumping elements 99 and "A" can be driven preferably from an electric motor, due to the common drive 7. The pump element 99 sucks air from the atmosphere, compresses it and forwards it over a compressed air line 55c to the respective injector 60. The pump element 99 can be designed as a screw pump and the like as a piston pump, as diaphragm pump. This is in the basis of FIGS. 1 to 5 described pumping element "A" promotes the medium from the tank of 59 on the pressure line 56a to the injector 60.

In the pressure line 56a, is connected a pressure sensor 96 and the pressure relief valve. As soon as the pressure sensor 96 in the pressure line 56a records a high pressure, the pressure relief valve 97 opens to relieve the pressure. The temperature of the fluid in the tank of 59 is captured by the temperature sensor 98.

This pump system can be used for SCR systems, which are also using air for the injection to support the atomization of the urea. While at the pump system in accordance with FIG. 6, no compressed air is used, in the pump system in accordance with FIG. 8, both SCR systems namely for an airless and air-assisted system can be supported.

In the drive connection between the both pumping elements "A" and 99 a freewheel can be provided, so that the electric motor 7 either can drive both pump elements at the same time or just one of the elements of the pump. Such a free-wheeling is intended mainly for pumping elements connected in sequence (FIG. 9a), because they have their own eccentric disc provided for each pumping element 10, 11. Basically, a free-wheeling as described, is also possible in the execution according to FIGS. 1 to 5. The second eccentric disc with the corresponding pumping element should, however, be offset to the first eccentric disc and arranged with the associated pumping element. In this set up, drive energy can be saved, wear be reduced, and increase of the service life of the pump system be achieved. The compressed air from the pumping element 99 can be pumped in an accumulator. The urea solution in the tank 59 is only specifically supported by the pumping element A for dosing into the exhaust flow during the injection. At higher injection frequencies and in the case the air pumping is not needed, the pump element "A" can be used as described before as a single pump element, driving in the same rotation direction, to promote the medium.

Figure 10:
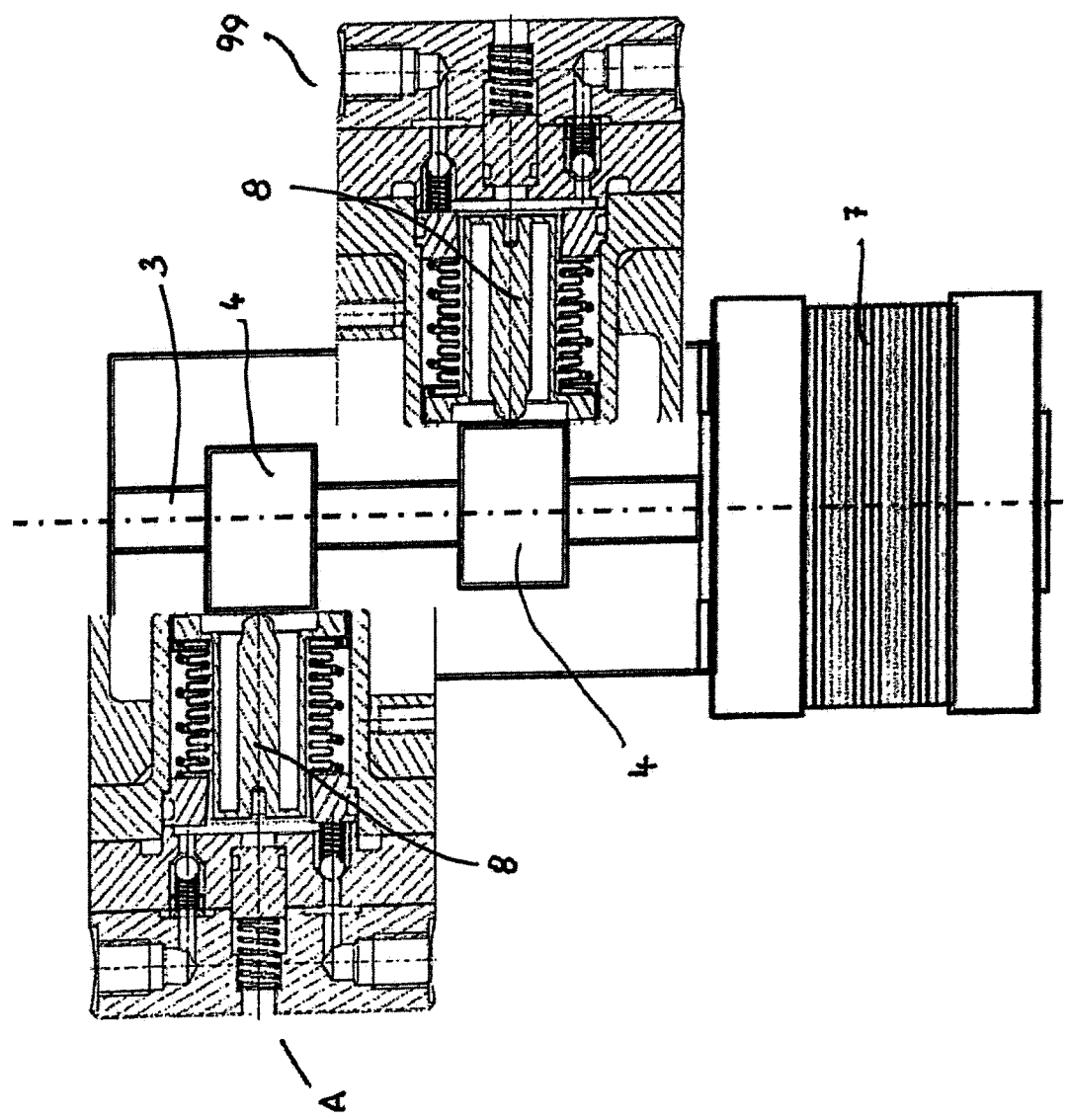
FIG. 10 is a cross section for two different pumps operated by a common drive of the present invention.

FIG. 10 shows an example of the free-wheeling set up, with the drive connection between the both pumping elements "A", 99. Both pump elements "A", 99 are advantageously equally designed and driven by a common drive 7. The joint drive shaft 3 is provided for both pump elements "A", 99. The shaft 3 has two eccentric discs 4, interacting as described with the actuation tappets 8 and both pump elements "A", 99. The associated eccentric disc 4, for the pumping element "A" is arranged on the drive shaft 3, so, that it will be taken only in one direction of rotation of the drive shaft. Rotating the drive shaft 3 in the other direction, the eccentric disk 4 is not rotating as a result of the free-wheel, so that the pumping element "A" is not activated.

The pumping element 99 associated eccentric disc 4 is sitting rotationally fixed onto the drive shaft 3, so that the eccentric disc 4 regardless of the direction of rotation, of the drive shaft 3, the pumping element 99 operates.

With this design, the flow amount and the power consumption of the pump can be reduced specifically. If different fluids are used, the pumping of only of one medium can be arranged, by switching the rotation of the drive shaft 3 in the direction in which the eccentric disc 4 stops and is not rotating.

The idling (or the driving) between the shaft and the associated driving element, in one rotationally direction is state of the art and is therefore also not closer described.

When a very fine dosage and flow rate of the medium 59 stored in the tank is wanted, a stepper motor can be used advantageously instead of the normal electric motor 7.

On the basis of FIGS. 1 to 5 described pumps have the pumps elements 10, 11, which can be used in a wide range of pump designs and applications. FIG. 9 shows schematically and exemplary possible arrangements of the pump elements 10, 11.

Figure 9A:
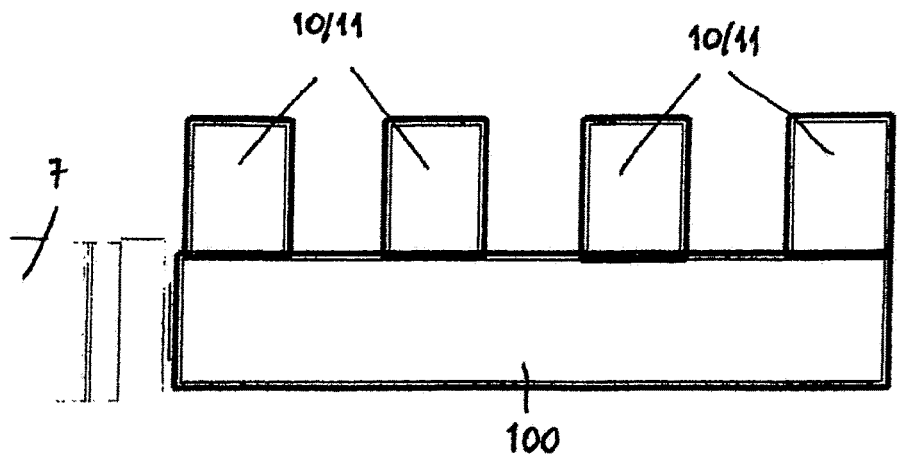
FIGS. 9A, 9B and 9C are schematic representations of various applications of the present invention.

The pump in accordance with FIG. 9a arranges the pump elements 10, 11 in sequence side by side. They sit on a pump housing 100, in which the drive shaft is located to actuate the pump elements. The pump elements are protruding from the front of the pump housing 100 and driven by the motor 7. The drive shaft extends longitudinally within the pump housing 100 and has according to the number of pumps elements 10, 11 a corresponding number of eccentric discs, which will activate the pump elements as described on the basis of FIGS. 1 to 5.

Figure 9B:
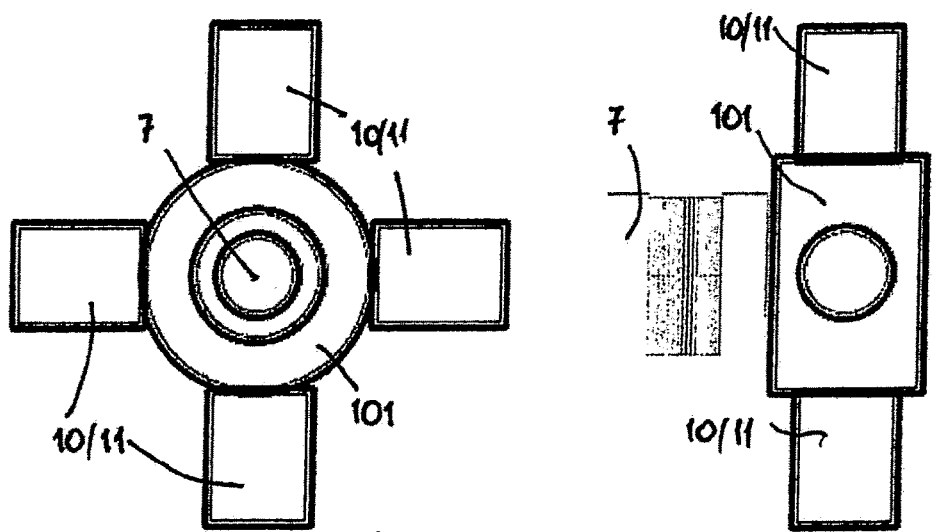

FIG. 9b shows a star-shaped arrangement of the pumping elements. The pump elements 10, 11 are radially arranged on a cylindrical pump housing 101. In the executed example four pump elements 10, 11 are arranged around the circumference of the pump housing 100, each in 90° angle intervals. The drive shaft 3, which is driven by the motor 7, is located in the center of the pump housing 101.

On the drive shaft 3 is the eccentric disc 4, which is rotationally capable to activate the pump elements 10, 11.

Figure 9C:
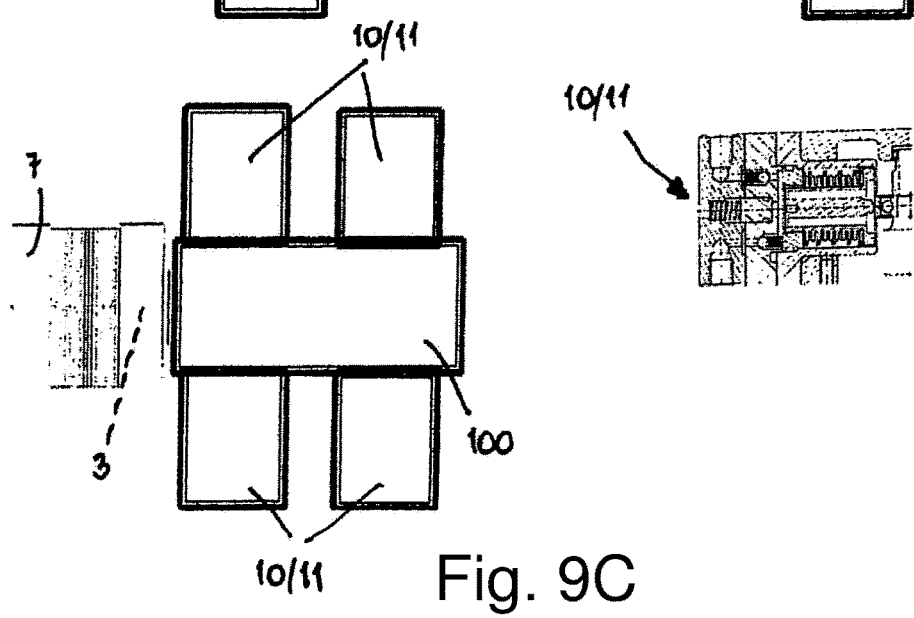

FIG. 9c shows an execution, where two opposed pumping elements 10, 11, on the flange side of housing 101, are arranged. The drive shaft 3 is powered rotationally by the motor 7 and extends longitudinally through the housing of 100. The shown example having, on the drive shaft 3, rotationally fixed, two eccentric discs, which will drive the opposed pumping elements 10, 11 in the pump.

On the basis of FIGS. 9a to 9c exemplary and described shown arrangements, it is shown that with the pumping elements 10, 11 as a module, many different applications easily can be designed and built. Such pumps can be simply manufactured and are inexpensive too. The number of the needed pump elements here depends on the desired pump volume to be achieved in the pump system.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A pump for a selective catalytic reduction (SCR) system in vehicles, comprising a housing in which at least one pump element is arranged, the at least one pump element activated by an eccentric drive which comprises a combination of a rotatable drive shaft and an eccentric disc fixed to and rotating with the rotatable drive shaft and which is provided within the housing, the at least one pump element comprising at least one pump piston which includes a hollow portion, and an actuation tappet in the hollow portion of the at least one pump piston and in contact with the eccentric disc and the at least one pump piston, the at least one pump piston being driven along its longitudinal axis by the contact of the actuation tappet with the eccentric drive during rotation of the eccentric drive, and the at least one pump piston comprising at least a spring bellow which is elastically deformable during pump operation, wherein:

the spring bellow surrounds a radial distance of the actuation tappet of the at least one pump element, where a free end of the actuation tappet contacts the eccentric disc which is part of the eccentric drive, the actuation tappet is under force of at least one spring, and the at least one spring is a compression spring which surrounds the spring bellow.

2. The pump according to claim 1, wherein the at least one pump piston is a hollow piston surrounded by the spring bellow.

3. The pump according to claim 2, wherein the spring bellow has a pumping space for radially limiting pumping a medium.

4. The pump according to claim 3, wherein the pumping space is between the spring bellow and an outer surface of the hollow piston.

5. The pump according to claim 3, wherein the pumping space is between the spring bellow and a mantle of a body part.

6. The pump according to claim 1, wherein the at least one pump piston is a hollow piston and the spring bellow extends between the hollow piston, a surrounding radial flange and a radial flange of the hollow piston.

7. The pump according to claim 1, wherein the spring bellow is attached with one end on an axial sliding ring and another end to a fixed housing ring.

8. The pump according to claim 1, wherein the at least one pump element has at least a pressure valve and at least a suction valve.

9. The pump according to claim 8, wherein the pressure valve and the suction valve are connected to a pumping space.

10. The pump according to claim 9, wherein the at least one pump element has a compensating system to absorb volume increase and expansion during freezing of a medium.

11. The pump according to of claim 10, wherein the compensating system includes at least a balance piston and the pumping space, which is partially limited, and which can be moved against spring force.

12. The pump according to claim 1, wherein the at least one pump element comprises several pump elements arranged in sequence side by side or in a star shape or in a form of opposed elements in the housing.

13. The pump according to claim 12, wherein the pump elements are radially arranged pump elements associated with a common eccentric disc.

14. The pump according to claim 1, wherein the actuation tappet of the at least one pump element, on its face facing a pumping space, is under power of at least one compression spring has a preload force greater than an operating pressure of the pump, but smaller than the force applied by freezing of a medium in the pumping space which would cause damaging pressure.

15. The pump according to of claim 1, wherein the at least one pump element is two pump elements positioned on opposing sides of the eccentric drive which drives the two pump elements simultaneously upon rotation.

16. The pump according to of claim 15,
wherein the at least one pump element has at least a pressure check valve and at least a suction check valve,
wherein, during a first cycle of the at least one pump element, the pressure check valve opens to suck a medium from a reservoir while the pressure check valve closes to prevent the medium from being discharged, and
wherein, during a second cycle of the at least one pump element, the pressure check valve closes to prevent the medium from being sucked from the reservoir, while the pressure check valve opens to discharge the medium.

17. The pump according to of claim 15,
wherein the at least one pump element comprises a hollow piston with radial flanges,
wherein a spring and the spring bellow are positioned surrounding an outside wall of the hollow piston,
wherein the actuation tappet is positioned inside the hollow piston and which reciprocates upon the rotation of the rotatable drive shaft and eccentric disc, and
wherein ring flanges form a stop, where the hollow piston with its radial flanges under the force of the bellow and the spring stop.

18. A pump for a selective catalytic reduction (SCR) system in vehicles, comprising a housing in which at least one pump element is arranged which is activated by an eccentric drive which comprises a combination of a rotatable drive shaft and eccentric disc fixed to and rotating with the rotatable drive shaft and which is provided within the housing, and the at least one pump element comprises at least one pump piston driven by the eccentric drive, the at least one pump piston comprising at least a spring bellow which is elastically deformable during pump operation,
wherein the at least one pump element is two pump elements positioned on opposing sides of the eccentric drive which drives the two pump elements simultaneously upon rotation,
wherein the at least one pump piston comprises a hollow piston with radial flanges,
wherein a spring and the spring bellow is positioned surrounding an outside wall of the hollow piston,
wherein a tappet is positioned inside the hollow piston and which reciprocates upon the rotation of the rotatable drive shaft and eccentric disc,
wherein ring flanges form a stop, wherein the hollow piston is arranged with its radial flanges under the force of the bellow and a spring stop,
wherein a retaining ring is located in a groove on an inside of the hollow piston,
wherein at one end of the hollow piston facing a side of the retainer ring lies a piston disc under the force of a compression spring within the hollow piston,
wherein another end of the compression spring is supported by the one end of the hollow piston,
wherein the hollow piston under an elastic compression of the spring bellow is displaced and a medium in a pumping space is pressurized, and the compression spring is elastically compressed, and
wherein expansion of freezing medium is absorbed by corresponding elastic deformation of the compression spring so that the bellow is not damaged.

19. The pump according to of claim 18,
wherein the hollow piston includes radial flanges one of which has an axial distance from a ring flange of the housing such that a balance room is formed between the radial flange and the ring flange, and
wherein the freezing medium in the pumping space generates an axial pressure on the one end of the hollow piston, the hollow piston axially moves and the compression spring elastically deforms so that the axial pressure is less than damaging pressure of the freezing medium, but larger than an operating pressure of the at least one pump element.

20. The pump according to of claim 19,
wherein one of the flanges is guided in a bearing,
the axial distance between the radial flange and the ring flange and thus a size of a compensation room are chosen so that the freezing medium in the pumping space can be absorbed, and
the compression spring is between the piston disc and the one end of the hollow piston.

21. The pump according to of claim 19, further comprising at least one balancing piston which acts as a pressure relief valve and pressure dampener, adjustable by a spring force of the compression spring acting towards the hollow piston.

* * * * *